United States Patent
Tang

(10) Patent No.: US 11,405,255 B2
(45) Date of Patent: Aug. 2, 2022

(54) DATA PROCESSING METHOD AND INTELLIGENT TERMINAL BASED ON ORTHOGONAL FREQUENCY DIVISION MULTIPLEXING (OFDM) SYSTEM

(71) Applicant: JRD Communication (Shenzhen) LTD., Shenzhen (CN)

(72) Inventor: Yanbo Tang, Shenzhen (CN)

(73) Assignee: JRD Communication (Shenzhen) LTD., Shenzhen (CN)

(*) Notice: Subject to any disclaimer, the term of this patent is extended or adjusted under 35 U.S.C. 154(b) by 79 days.

(21) Appl. No.: 16/760,456

(22) PCT Filed: Oct. 30, 2018

(86) PCT No.: PCT/CN2018/112802
§ 371 (c)(1),
(2) Date: Apr. 30, 2020

(87) PCT Pub. No.: WO2019/085913
PCT Pub. Date: May 9, 2019

(65) Prior Publication Data
US 2020/0351140 A1    Nov. 5, 2020

(30) Foreign Application Priority Data
Oct. 30, 2017    (CN) .......................... 201711041949.6

(51) Int. Cl.
*H04L 27/26* (2006.01)
*H04J 13/00* (2011.01)

(52) U.S. Cl.
CPC ...... *H04L 27/2671* (2013.01); *H04J 13/0062* (2013.01); *H04L 27/2672* (2013.01); *H04L 27/2675* (2013.01)

(58) Field of Classification Search
CPC ............ H04L 27/2671; H04L 27/2672; H04L 27/2675; H04L 27/2613; H04L 27/2663;
(Continued)

(56) References Cited

U.S. PATENT DOCUMENTS

| 8,923,338 B2 | 12/2014 | Luo et al. |
| 2008/0219343 A1* | 9/2008 | Wu ...................... H04L 25/0228 375/232 |

(Continued)

FOREIGN PATENT DOCUMENTS

| CN | 101232472 | 7/2008 |
| CN | 101527700 | 9/2009 |

(Continued)

OTHER PUBLICATIONS

International Search Report and the Written Opinion dated Jan. 30, 2019 From the International Searching Authority Re. Application No. PCT/CN2018/112802 and Its Translation of Search Report Into English. (9 Pages).

*Primary Examiner* — Vineeta S Panwalkar

(57) ABSTRACT

The invention discloses a data processing method and an intelligent terminal based on an orthogonal frequency division multiplexing (OFDM) system. The method comprises: a communication base station inserting equally spaced frequency domain reference signals to frequency domain data; obtaining frequency domain signals by equivalently transforming the frequency domain data being inserted with the frequency domain reference signals, wherein the frequency domain signals comprise the frequency domain reference signals superimposed with the frequency domain data; obtaining time domain signals by performing inverse Fast Fourier Transform (IFFT) on the frequency domain signals, wherein the time domain signals comprise time domain reference signals superimposed with the time domain data;

(Continued)

and transmitting the time domain signals to the intelligent terminal.

14 Claims, 5 Drawing Sheets

(58) Field of Classification Search
CPC .............. H04L 27/2666; H04L 27/2695; H04J 13/0062
See application file for complete search history.

(56) References Cited

U.S. PATENT DOCUMENTS

2008/0240285 A1\* 10/2008 Han ................... H04L 27/2615
375/295
2017/0155479 A1\* 6/2017 Sun ................... H04W 72/0453

FOREIGN PATENT DOCUMENTS

| CN | 102065047 | 5/2011 |
| CN | 108055222 | 5/2018 |
| WO | WO 2019/085913 | 5/2019 |

\* cited by examiner

DATA PROCESSING METHOD AND INTELLIGENT TERMINAL BASED ON ORTHOGONAL FREQUENCY DIVISION MULTIPLEXING (OFDM) SYSTEM

RELATED APPLICATIONS

This application is a National Phase of PCT Patent Application No. PCT/CN2018/112802 having International filing date of Oct. 30, 2018, which claims the benefit of priority of Chinese Patent Application No. 201711041949.6 filed on Oct. 30, 2017. The contents of the above applications are all incorporated by reference as if fully set forth herein in their entirety.

FIELD AND BACKGROUND OF THE INVENTION

The invention relates to a technical field of wireless communication technologies, and more particularly, to a data processing method and an intelligent terminal based on orthogonal frequency division multiplexing (OFDM) system.

Orthogonal frequency division multiplexing (OFDM) is orthogonal frequency division multiplexing technology which divides a channel into several orthogonal sub-channels, converts high-rate data signals into parallel low-rate data sub-streams, modulates low-rate data sub-streams on sub-channels for transmission.

In a communications system, a channel typically provides much wider bandwidth than is required to transmit a stream of signals. Occupying one entire channel for transmission of only one signal stream is very wasteful. A frequency division multiplexing method such as OFDM may be used to exploit channel bandwidth.

However, an OFDM system has high synchronization requirements, and, without a precisely synchronized receiver, transmitted data cannot be reliably recovered. Among various synchronization methods, pseudo-noise (PN) sequence is outstanding in achieving better system performance and is currently widely adopted.

Specifically, the scheme based on the OFDM system includes synchronously transmitting the PN sequence and OFDM symbols. A guide frame structure includes a capture phase and a synchronous tracking phase. Only the PN sequence is sent during the capture phase. The PN sequence is superimposed on the OFDM symbol sequence and transmitted during the synchronous tracking phase. The scheme identifies starting positions of OFDM symbols to achieve synchronization of the OFDM system.

However, synchronization for the method is slow and affects user experience.

SUMMARY OF THE INVENTION

Technical Problems

An embodiment of the invention provides a data processing method and an intelligent terminal based on an orthogonal frequency division multiplexing (OFDM) system, which can enhance synchronization and improve user experience.

Technical Solutions

To address the technical problems, a first aspect of a first technical solution of the invention provides a data processing method based on an OFDM system, wherein the data processing method comprises: a communication base station inserting equally spaced frequency domain reference signals in frequency domain data; obtaining frequency domain signals by equivalently transforming the frequency domain data being inserted with the frequency domain reference signals, wherein the frequency domain signals comprise the frequency domain reference signals superimposed with the frequency domain data; obtaining time domain signals by performing inverse Fast Fourier Transform (IFFT) on the frequency domain signals, wherein the time domain signals comprise time domain reference signals superimposed with the time domain data; and transmitting the time domain signals to the intelligent terminal.

In particular, the frequency domain reference signals comprise a Zadoff-Chu sequence.

In particular, the step of obtaining frequency domain signals by equivalently transforming the frequency domain data being inserted with the frequency domain reference signals, further comprises:

transmitting the frequency domain data being inserted with the frequency domain reference signals through at least a first subcarrier and a second subcarrier respectively;

replacing the frequency domain reference signals transmitted through the first subcarrier with data 0;

replacing the frequency domain data transmitted through the second subcarrier with data 0; and obtaining the frequency domain signals comprising the frequency domain reference signals superimposed with the frequency domain data.

In particular, the steps of the communication base station inserting equally spaced frequency domain reference signals in frequency domain data further comprises:

the communication base station inserting the equally spaced frequency domain reference signals in OFDM symbols of the frequency domain data according to a specific pilot interval.

In particular, the pilot interval is 8.

To address the technical problems, a second aspect of a second technical solution of the invention provides a data processing method based on an OFDM system, wherein the data processing method comprises: an intelligent terminal receiving time domain signals comprising time domain reference signals superimposed with time domain data; performing Fast Fourier Transform (FFT) on the received time domain signals to generate frequency domain signals comprising frequency domain reference signals superimposed with frequency domain data; obtaining the frequency domain data being inserted with the frequency domain reference signals by equivalently transforming the frequency domain signals; and obtaining the frequency domain data by separating the frequency domain reference signals and the frequency domain data.

In particular, after the step of the intelligent terminal receiving the time domain signals comprising the time domain reference signals superimposed with the time domain data, and before the step of performing FFT on the received time domain signals to generate the frequency domain signals comprising the frequency domain reference signals superimposed with the frequency domain data, the method further comprises:

the intelligent terminal matching the time domain reference signals with preset reference signals to determine a synchronous timing function; and determining locations of the frequency domain reference signals according to the synchronous timing function.

In particular, the step of the intelligent terminal matching the time domain reference signals with the preset reference signals to determine the synchronous timing function further comprises:

the intelligent terminal matching the time domain signals with the preset reference signals using the maximum likelihood algorithm to determine the synchronous timing function.

In particular, the preset reference signals comprise a Zadoff-Chu sequence.

In particular, the reference signals comprise a time domain signal sequence transformed from the frequency domain reference signals equally spaced and inserted by a communication base station into the frequency domain data.

In particular, the step of performing FFT on the received time domain signals to generate the frequency domain signals comprising the frequency domain reference signals superimposed with the frequency domain data, further comprises:

the intelligent terminal distinguishing time domain synchronization points using the synchronous timing function, and performing FFT on the received time domain signals according to the time domain synchronization points to generate the frequency domain signals comprising the frequency domain reference signals superimposed with the frequency domain data.

In particular, the step of obtaining the frequency domain data being inserted with the frequency domain reference signals by equivalently transforming the frequency domain signals further comprises:

the FFT processed frequency domain signals containing a subcarrier used for transmission of data signals, and the intelligent terminal obtaining the frequency domain data being inserted with the frequency domain reference signals by demodulating the data signal transmitted by the subcarrier.

To address the technical problems, a third aspect of a third technical solution of the invention provides an intelligent terminal comprising a communication circuit, memory, and a processor, wherein the processor is coupled to and connected with the communication circuit and the memory, the communication circuit is configured to communicate with a base station, receive and transmit data, the memory is used to store a computer program performed by the processor and intermediate data generated during execution of the computer program, the processor when executing the computer program, performs the following steps:

the intelligent terminal receiving time domain signals comprising time domain reference signals superimposed with time domain data;

performing FFT on the received time domain signals to generate frequency domain signals comprising frequency domain reference signals superimposed with frequency domain data;

obtaining the frequency domain data being inserted with the frequency domain reference signals by equivalently transforming the frequency domain signals; and obtaining the frequency domain data by separating the frequency domain reference signals and the frequency domain data.

In particular, after the step of the intelligent terminal receiving the time domain signals comprising the time domain reference signals superimposed with the time domain data, and before the step of performing FFT on the received time domain signals to generate frequency domain signals comprising frequency domain reference signals superimposed with frequency domain data, the intelligent terminal further executes the step of:

the intelligent terminal matching the time domain reference signals with preset reference signals to determine a synchronous timing function; and determining locations of the frequency domain reference signals according to the synchronous timing function.

In particular, the step of the intelligent terminal matching the time domain reference signals with the preset reference signals to determine the synchronous timing function further comprises:

the intelligent terminal matching the time domain signals with the preset reference signals using the maximum likelihood algorithm to determine the synchronous timing function.

In particular, the preset reference signals comprise a Zadoff-Chu sequence.

In particular, the reference signals comprise a time domain signal sequence transformed from the frequency domain reference signals equally spaced and inserted by a communication base station into the frequency domain data.

In particular, the step of performing FFT on the received time domain signals to generate the frequency domain signals comprising the frequency domain reference signals superimposed with the frequency domain data, further comprises:

the intelligent terminal distinguishing time domain synchronization points using the synchronous timing function, and performing FFT on the received time domain signals according to the time domain synchronization points to generate the frequency domain signals comprising the frequency domain reference signals superimposed with the frequency domain data.

In particular, the step of obtaining the frequency domain data being inserted with the frequency domain reference signals by equivalently transforming the frequency domain signals further comprises:

the FFT processed frequency domain signals containing a subcarrier used for transmission of data signals, and the intelligent terminal obtaining the frequency domain data being inserted with the frequency domain reference signals by demodulating the data signal transmitted by the subcarrier.

Useful Effects

The communication base station of the invention inserts the equally spaced frequency domain reference signals into the frequency domain data, and performs equivalent transformation and IFFT on the frequency domain data being inserted with the frequency domain reference signals, to obtain and send the time domain signals comprising the time domain reference signals superimposed with the time domain data to the intelligent terminal. The data processing method improves synchronization processing and user experience.

DETAILED DESCRIPTION OF SPECIFIC EMBODIMENTS OF THE INVENTION

The invention provides a data processing method and an intelligent terminal based on an orthogonal frequency division multiplexing (OFDM) system. To make the purpose, technical solutions and technical effects of the invention clearer, description of the invention is detailed in the following. Note that specific embodiments described here are only used to illustrate, and not used to limit the invention.

Figure 1:
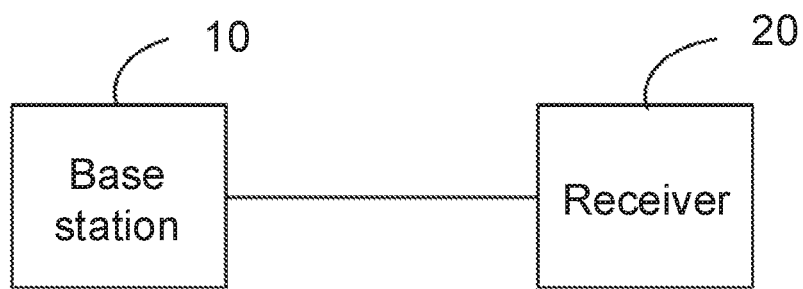
FIG. 1 is a structural schematic diagram of a data transmission system according to an embodiment of the invention.

With reference to FIG. 1, a structural schematic diagram of a data transmission system according to an embodiment of the invention is shown. The data transmission system of the embodiment includes a communication base station 10 and a receiver 20. Data transmission between the communication base station 10 and the receiver 20 is carried through wireless channels. Particularly, the receiving 20 may include an intelligent terminal, such as a smartphone, a tablet personal computer (PC), and others.

In the communication system, bandwidth resources of the wireless channels are limited, while the bandwidth provided by the wireless channels is usually much more than the bandwidth required by data during data transmission. To exploit channel bandwidth, OFDM may be used to transmit data. However, OFDM systems have higher requirements on synchronization and channel estimation. To improve synchronization processing, the embodiment provides a data processing method based on an OFDM system from a perspective of a communication base station.

Figure 2:
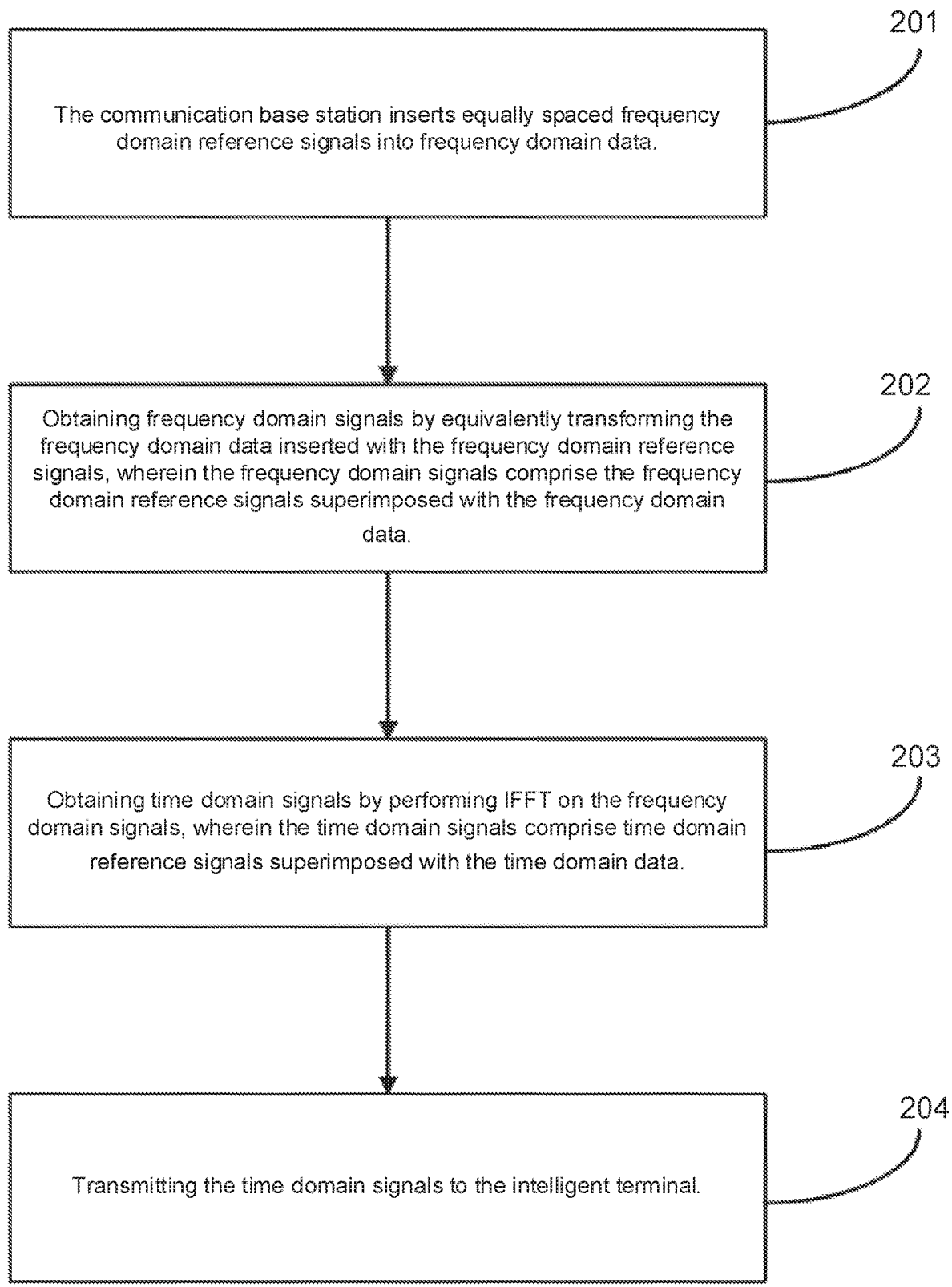
FIG. 2 is a flowchart of a data processing method based on the orthogonal frequency division multiplexing (OFDM) system according to an embodiment of the invention.

With reference to FIG. 2, FIG. 2 is a flowchart of the data processing method based on the OFDM system according to an embodiment of the invention.

201: The communication base station inserts equally spaced frequency domain reference signals in frequency domain data.

In the embodiment, the communication base station inserts the equally spaced frequency domain reference signals into the frequency domain data. Specifically, the communication base station inserts the frequency domain reference signals in OFDM symbols of the frequency domain data according to a specific pilot interval.

In a specific embodiment, a Zadoff-Chu sequence is used as the frequency domain reference signals. According to characteristics of fourier transformation, the equally spaced and inserted sequence in a frequency domain after being processed with inverse Fast Fourier Transform (IFFT) forms a periodic signal on the time domain, which has good autocorrelation characteristics.

Generally, an OFDM system has a pilot interval of 6. In the embodiment, the pilot interval is 8, so that with the same number of subcarriers, the embodiment of the data processing method requires a less number of pilot signals, that is, a less number of frequency domain reference signals, and less bandwidth resources.

202: Obtaining frequency domain signals by equivalently transforming the frequency domain data being inserted with the frequency domain reference signals, wherein the frequency domain signals comprise the frequency domain reference signals superimposed with the frequency domain data.

In the embodiment, the communication base station obtains frequency domain signals by equivalently transforming the frequency domain data being inserted with the frequency domain reference signals, wherein the frequency domain signals comprise the frequency domain reference signals superimposed with the frequency domain data.

Specifically, the frequency domain data being inserted with the frequency domain reference signals is transmitted through at least a first subcarrier and a second subcarrier respectively. The frequency domain signals with frequency domain reference signals superimposed with the frequency domain data is obtained by transmitting the frequency domain data being inserted with the frequency domain reference signals through at least a first subcarrier and a second subcarrier respectively, replacing the frequency domain reference signals transmitted through the first subcarrier with data 0, replacing the frequency domain data transmitted through the second subcarrier with data 0, and retaining the frequency domain reference signals.

203: Obtaining time domain signals by performing IFFT on the frequency domain signals, wherein the time domain signals comprise time domain reference signals superimposed with the time domain data.

In the embodiment, the communication base station obtains time domain signals comprising the time domain reference signals superimposed with the time domain data by performing IFFT on the frequency domain signals. The time domain signals have periodicity and symmetry in OFDM symbols collectively. The characteristics facilitate the receiver to have many ways to calculate correlation operations of a synchronous timing function, so that the receiver can choose a corresponding operation in different scenarios to improve a progress of synchronization.

Specifically, since the frequency domain reference signals are inserted with equal intervals, the reference signals on the time domain after the IFFT are periodic. The frequency domain data is converted to time domain data after the IFFT. The time domain data is superimposed with the time domain reference signals to form the time domain signals. Additionally, the reference signals superimposed in the way actually are not added with any redundant information, but has a pseudo-overlay effect on the time domain.

Additionally, according to characteristics of Fourier transformation, energy of the time domain reference signals at the step is ⅛ of the energy of the frequency domain reference signal, so that interference of the reference signals to data signals is reduced.

204: transmitting the time domain signals to the intelligent terminal.

In the embodiment, the communication base station sends the time domain signals including time domain reference signals superimposed with the time domain data to the intelligent terminal, so that the intelligent terminal can assist in accurate synchronization by referencing to signal auto-correlation and intercorrelation characteristics, thereby improving the progress of synchronization.

Figure 3:
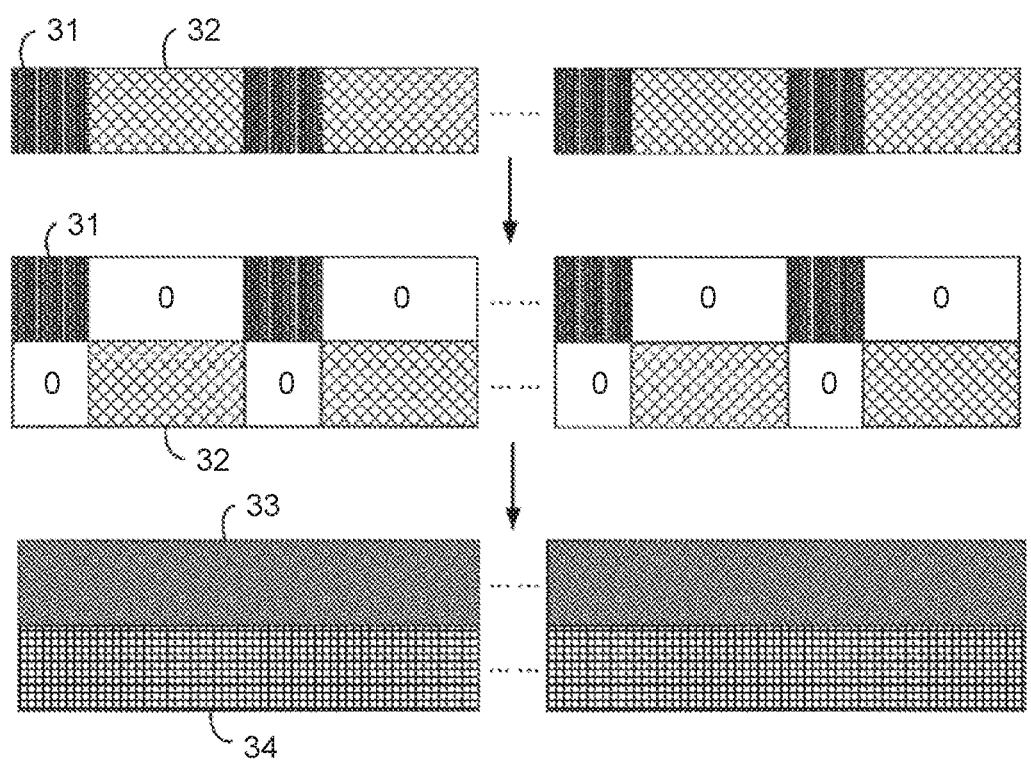
FIG. 3 is a schematic diagram showing signal formats in the data processing method based on an OFDM system.

With reference to FIG. 3, to clearly explain conversion of data signals during data processing in the embodiment, FIG. 3 is a schematic diagram showing signal formats in the data processing method based on an OFDM system of FIG. 2.

As shown in FIG. 3, the frequency domain signals including the frequency domain reference signals 31 superimposed with the frequency domain data 32 is formed by inserting equally spaced frequency domain reference signals 31 into OFDM symbols of frequency domain data 32 for performing equivalent transformation. In particular, the frequency domain reference signals 31 in the frequency domain signals transmitted by the first subcarrier is replaced by data 0, and only the frequency domain data 32 is reserved. The frequency domain data 32 in the frequency domain signals transmitted by the second subcarrier is replaced by data 0, and only the frequency domain reference signals 31 is reserved. Then the frequency domain signals are processed with IFFT to generate the time domain signals comprising the time domain reference signals 33 and the time domain data 34.

Different from the current technology, the communication base station of the embodiment inserts the equally spaced frequency domain reference signals into the frequency domain data, and performs equivalent transformation and IFFT on the frequency domain data being inserted with the frequency domain reference signals, to obtain and send the time domain signals comprising the time domain reference signals superimposed with the time domain data to the intelligent terminal. The data processing method improves synchronization processing and user experience.

Figure 4:
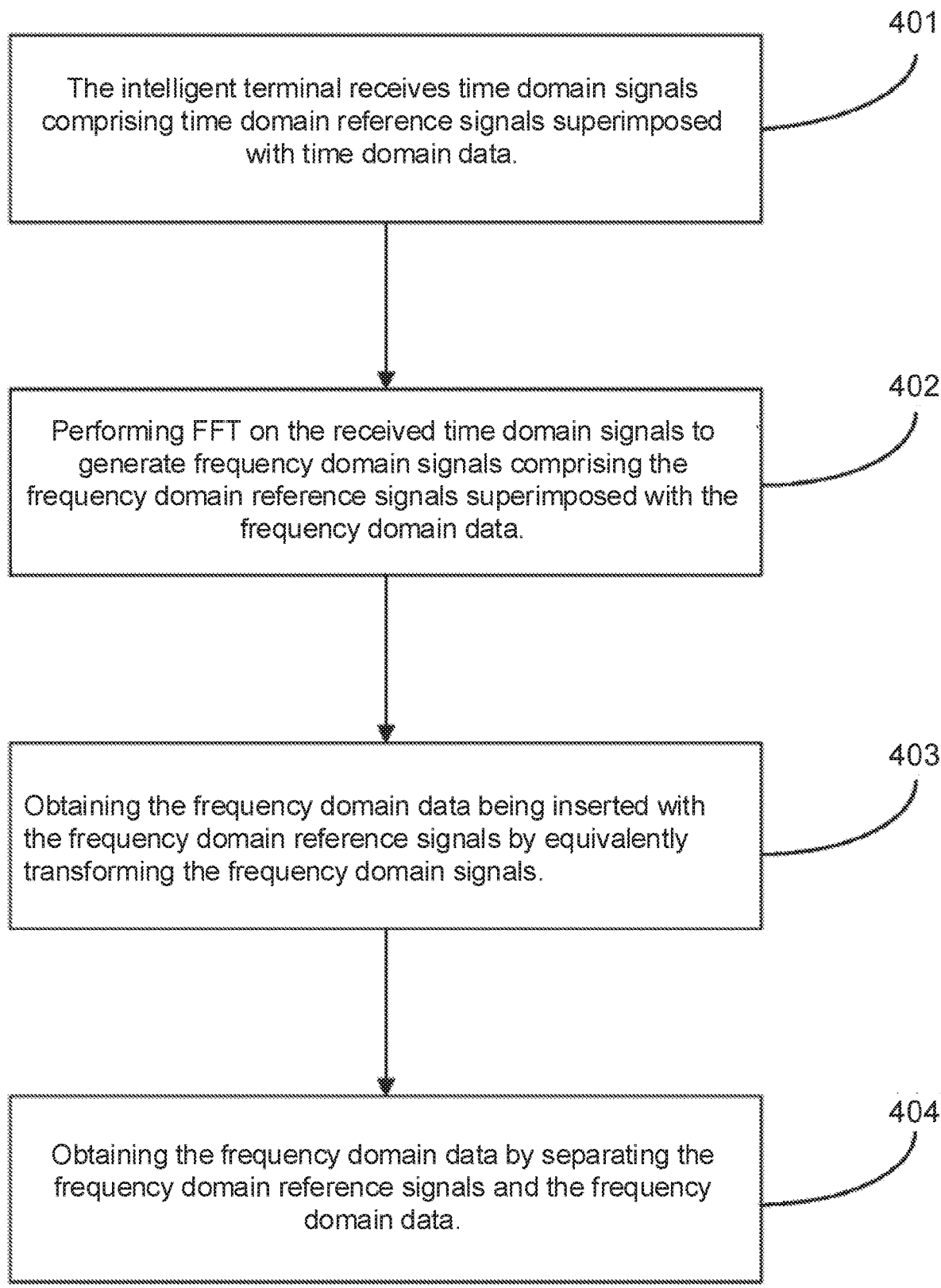
FIG. 4 is a flowchart a data processing method based on the OFDM system according to another embodiment of the invention.

With reference to FIG. 4, FIG. 4 is a flowchart of the data processing method based on the OFDM system according to another embodiment of the invention. With cross reference to FIG. 1, the embodiment provides a data processing method based on the OFDM system from the perspective of the receiver. In particular, the receiver of the embodiment is the intelligent terminal.

401: the intelligent terminal receiving time domain signals comprising time domain reference signals superimposed with time domain data.

Specifically, the intelligent terminal may include a smartphone, a tablet PC, and others.

In the embodiment, the intelligent terminal receives the time domain signals comprising time domain reference signals superimposed with time domain data from the communication base station.

Additionally, reference signals are preset in the intelligent terminal. The reference signals comprise the sequence of time domain signals transformed from the frequency domain reference signals equally spaced and inserted by a communication base station into the frequency domain data in the afore mentioned embodiment. The reference signals have good auto-correlation and intercorrelation characteristics with the time domain signals received by the intelligent terminal, where the time domain signals comprise the time domain reference signals superimposed with the time domain data. To exploit good auto-correlation characteristics of the Zadoff-Chu sequence, one of the embodiments uses a Zadoff-Chu sequence as preset reference signals.

Further, the intelligent terminal matches the time domain reference signals with the preset reference signals to determine the synchronous timing function, and determines the location of the frequency domain reference signals according to the synchronous timing function. However, the pilot is inserted in the first OFDM symbol and the penultimate OFDM symbol in each time slot. Because of periodicity of the reference sequence, correctly distinguishing the time domain synchronization points relies on reference to the timing function within each period at the cost of higher calculation complexity. The embodiment realizes simple and accurate timing using a maximum likelihood algorithm to match the time domain signals with the preset reference signals to determine the synchronous timing function.

402: Performing Fast Fourier Transform (FFT) on the received time domain signals to generate frequency domain signals comprising the frequency domain reference signals superimposed with the frequency domain data.

In the embodiment, the intelligent terminal distinguishes the time domain synchronization points using the synchronous timing function, and performs FFT on the received time domain signals according to the time domain synchronization points to generate the frequency domain signals comprising the frequency domain reference signals superimposed with the frequency domain data.

403: Obtaining the frequency domain data being inserted with the frequency domain reference signals by equivalently transforming the frequency domain signals.

In the embodiment, the intelligent terminal equivalently transforms the frequency domain signals to obtain the frequency domain data inserted with the frequency domain reference signals.

Specifically, the frequency domain signals obtained from the FFT contains a subcarrier used for the transmission of data signal. The data signals transmitted by the subcarrier may be obtained by demodulating the subcarrier. In the embodiment, the intelligent terminal demodulates the data signals carried in the subcarrier to obtain the frequency domain data with the inserted frequency domain reference signals.

404: Obtaining the frequency domain data by separating the frequency domain reference signals and the frequency domain data.

In the embodiment, the intelligent terminal separates the frequency domain data from the frequency domain signals to obtain the frequency domain data, where the frequency domain data is the data sent to the intelligent terminal by the communication base station.

In the embodiment, the communication base station and the intelligent terminal use an OFDM system for data transmission. Specifically, the communication base station converts the frequency domain data into the time domain signals that include time domain reference signals superimposed with the time domain data, and sends the time domain signals to the intelligent terminal. The intelligent terminal reproduces the frequency domain data from the time domain signals comprising the time domain reference signals superimposed with the time domain data to realize data transmission. The data transmission method of the invention enables the intelligent terminal to assist in precise synchronization and improve synchronization processing by referencing to autocorrelation and intercorrelation characteristics of the reference signals.

Different from current technology, the intelligent terminal of the embodiment receives the time domain signals that include time domain reference signals superimposed with the time domain data. Additionally, the intelligent terminal has a preset reference signal. The reference signals comprise the time domain signal sequence transformed from the frequency domain reference signals equally spaced and inserted by a communication base station into the frequency domain data. The synchronous timing function is determined based on autocorrelation characteristics of the reference signals and the received time domain signals. A corresponding data processing method which can improve synchronization processing and user experience is determined according to the synchronous timing function.

A person with ordinary skills in the art can appreciate that all or part of the steps in the various methods of the embodiments can be realized by a program with instructions accompanying with hardware components. The program that can be stored in a computer-readable storage medium that may include a read only memory (ROM), a random access memory (RAM), a disk, or a disc.

Figure 5:
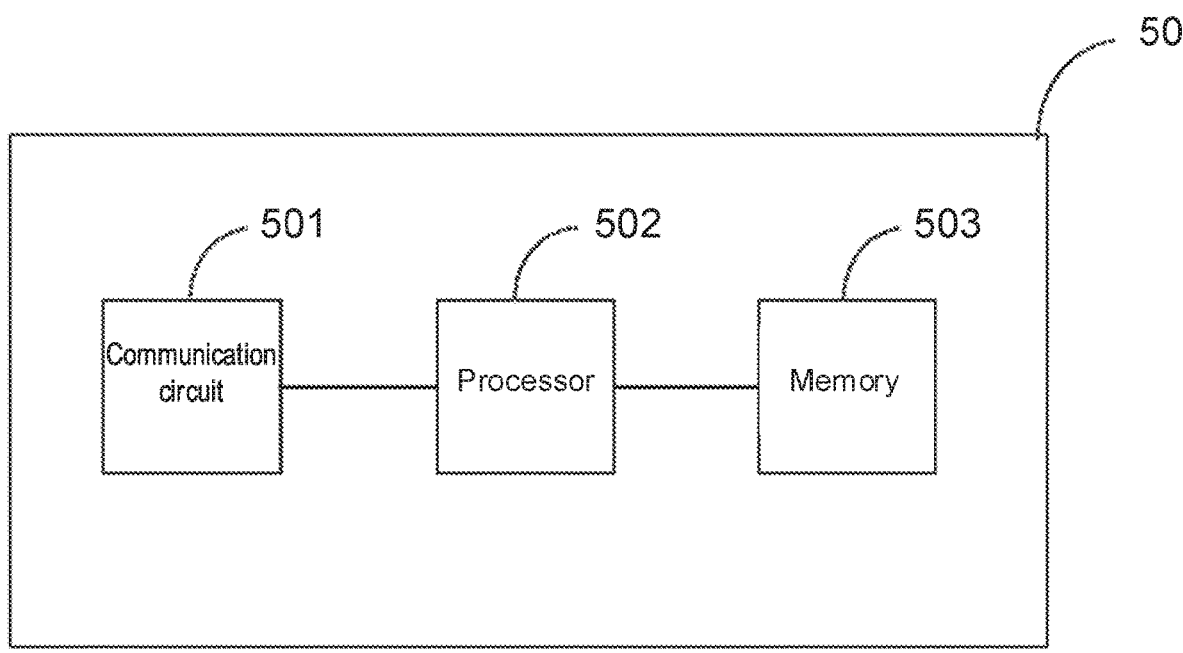
FIG. 5 is a schematic diagram of the intelligent terminal according to an embodiment of the invention.

With reference to FIG. 5, FIG. 5 is a structural schematic diagram of the intelligent terminal according to an embodiment of the invention. The intelligent terminal may include one of a smartphone and an iPad.

Specifically, as shown in FIG. 5, the intelligent terminal 50 of the embodiment may include a communication circuit 501, a processor 502, and a processor 503. Particularly, the processor 502 is coupled with or connected to the communication circuit 501 and the processor 503. Additionally, the communication circuit 501 can be used to communicate with the communication base station, obtain and transmit information. The processor 502 can realize the data processing method based on the OFDM system in any of the embodiments from the perspective of the receiver.

The specific steps regarding the method of data processing have been detailed and will not be discussed here.

Figure 6:
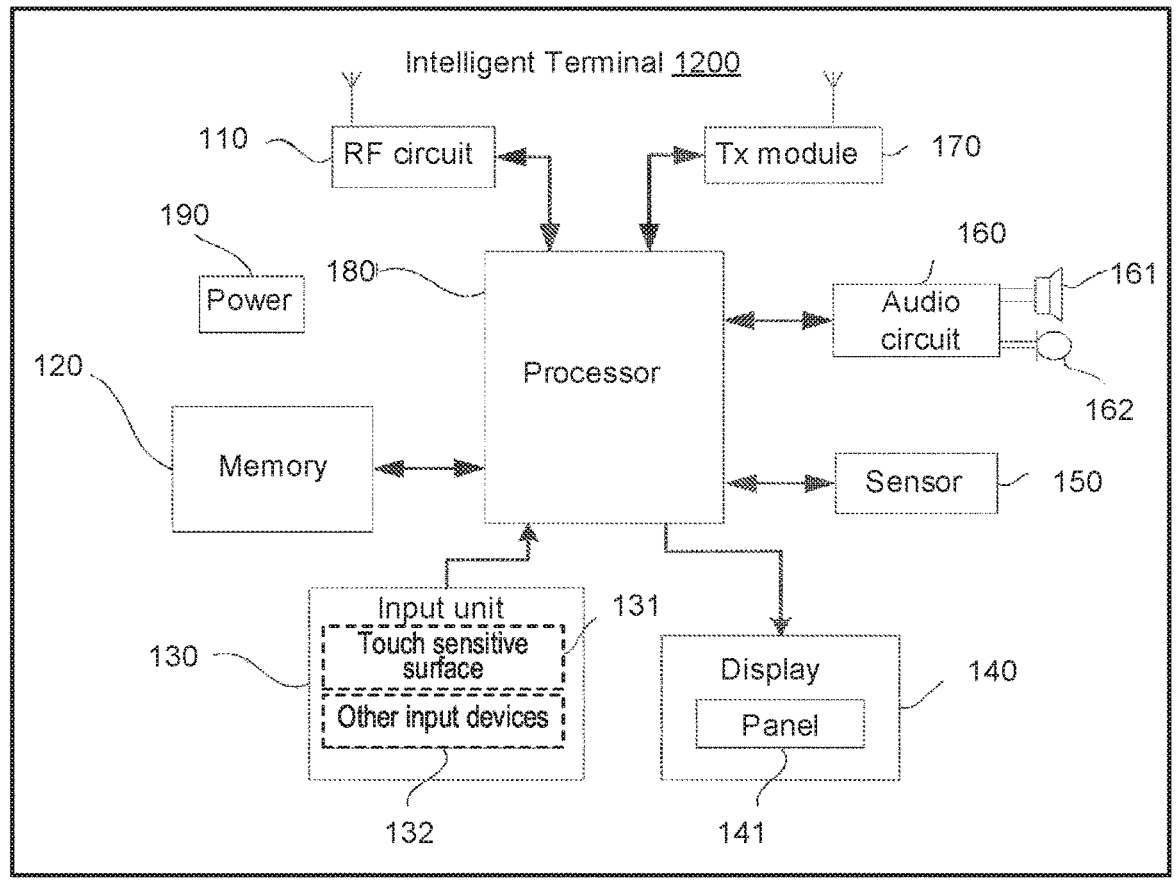
FIG. 6 is a schematic diagram showing specific structure of the intelligent terminal according to an embodiment of the invention.

FIG. 6 is a schematic diagram showing a specific structural view of the intelligent terminal according to an embodiment of the invention. The intelligent terminal may implement the data processing method based on the OFDM system provided in the embodiments. The intelligent terminal 1200 may be a smartphone or a tablet PC.

As shown in FIG. 6, the intelligent terminal 1200 may include a radio frequency (RF) circuit 110, a memory 120 having one or more (only one shown in the figure) computer readable storage media, an input unit 130, a display unit 140, a sensor 150, an audio circuit 160, a transmission module 170, a processor 180 having one or more (only one shown in the figure) processing cores, and a power supply 190. A person with ordinary skills in the art can appreciate that structure of the intelligent terminal 1200 shown in FIG. 6 does not limit the intelligent terminal 1200, and may include more or less parts than the illustration, or be combined with other parts, or associated with different parts layout. Where:

The RF circuit 110 is used to receive and send electromagnetic waves, to realize conversions between electromagnetic waves and electrical signals, so as to communicate with communication networks or other equipment. The RF circuit 110 may include a variety of current circuit components for performing the functions, such as antennas, RF transceivers, digital signal processors, encryption/decryption chips, subscriber identity module (SIM) cards, and memory. The RF circuit 110 can communicate with various networks such as the Internet, intranet, wireless network, or through wireless networks to communicate with other devices. The wireless networks may include cellular telecommunication networks, wireless local area networks, or metro networks. The wireless networks can use a variety of communication standards, protocols and technologies, including, but not limited to, global system for mobile communication (GSM), enhanced data GSM environment (EDGE), wideband code division multiple access (WCDMA), code division multiple access (CDMA), time division multiple access (TDMA), WIRELESS FIDELITY (Wi-Fi), such as IEEE 802.11a, IEEE 802.11b, IEEE 802.11g and/or IEEE 802.11n, Internet Telephony voice over internet protocol (VoIP), worldwide interoperability for microwave access (Wi-Max), other protocols for mailing, instant messaging and short message service (SMS), and any other appropriate communication protocols, even those protocols that are not yet developed.

The memory 120 may be used for storing software programs and modules, such as program instructions/modules corresponding to the data processing methods based on the OFDM system in the aforementioned embodiments. The processor 180 executes the software programs and modules stored in memory 120 to perform a variety of functional applications and data processing, that is, to achieve the functions of data processing method based on the OFDM system. The memory 120 may include a high-speed RAM as well as a non-volatile memory, such as one or more magnetic storage devices, flash memories, or other non-volatile solid state memories. In some instances, the memory 120 can further include memory remotely located relative to the processor 180, which can be connected to the intelligent terminal 1200 via a network connection. Examples of the network include, but are not limited to, the Internet, intranet, local area network, mobile communication network and any combination of the networks.

The input unit 130 can be used to receive input numeric or character information and to generate input signals of a keyboard, a mouse, a lever, an optical device, or a trackball related to user settings and functional controls. Specifically, the input unit 130 may include a touch-sensitive surface 131 and other input devices 132. The touch-sensitive surface 131, also known as a touch display or a trackpad, collects the user touch operation on or near the surface, such as operations on the touch-sensitive surface 131 or near the touch-sensitive surface 131 triggered by a user uses using a finger, stylus, or any suitable object or accessory, and drives an appropriate connected device according to the preconfigured program. The touch-sensitive surface 131 can optionally include two parts: a touch detection device and a touch controller. Particularly, the touch detection device detects locations and directions of user touch operations, detects the signals generated by the touch operations, and transmits the signals to the touch controller. The touch controller receives the touch signals from the touch detection device, converts the touch signals into contact coordinates, and sends the coordinates to the processor 180, and can receive and execute commands from the processor 180. Additionally, a touch-sensitive surface 131 can be implemented by various types of resistive, capacitive, infrared, and surface sound wave touch-sensitive surfaces. In addition to the touch-sensitive surface 131, the input unit 130 can also include other input devices 132. Specifically, other input devices 132 may include but not limited to one of more of physical keyboards, function keys, such as volume control keys, and switch keys, trackballs, mice, levers.

The display unit 140 can be used to display information entered by or presented to users, as well as to the various graphical user interfaces (GUIs) of the intelligent terminal 1200, which can include graphics, text, icons, videos and any combination of the GUIs. The display unit 140 may include a display panel 141, which may be optionally configured with a liquid crystal display (LCD), or an organic light-emitting diode (OLED) display panel. Further, the touch-sensitive surface 131 can cover the display panel 141. When detecting touch operations on surface or touch operations in proximity, the sensitive surface 131 transmits the detected operations to the processor 180 to determine the type of a touch event. The processor 180 provides corresponding visual output on the display panel 141 according to the type of the touch event. Although the touch-sensitive surface 131 and the display panel 141 in FIG. 6 are used as two separate components to implement the input and output functions, in some embodiments, the touch-sensitive surface 131 can be integrated with the display panel 141 to implement the input and output functions.

The intelligent terminal 1200 may also include at least one sensor 150, such as an optical sensor, a motion sensor and a sensor of other types. Specifically, the optical sensor may include an ambient light sensor and a proximity sensor. In particular, the ambient light sensor can adjust brightness of the display panel 141 according to strength of ambient light. The proximity sensor can turn off the display panel 141 and/or backlight when the intelligent terminal 1200 moves to an ear. As a motion sensor, a gravity acceleration sensor can detect acceleration in all directions, generally three axes, and detect a level and a direction of gravity at rest. The gravity acceleration sensor can be used in applications of identifying mobile phone orientation, such as vertical and horizontal screen switching, games, and magnetometer calibration, applications of vibration recognition related functions, such as pedometers and tapping. The intelligent terminal 1200 can also be configured gyroscopes, barometers, hygrometers, thermometers, infrared sensors, and other sensors, which are not detail in the description.

The audio circuit 160, speaker 161, microphone 162 can provide an audio interface between a user and the intelligent terminal 1200. The audio circuit 160 can receive electrical signals converted from audio data and transmit received electrical signals to the speaker 161. The speaker 161 converts the electrical signals to sound signals for output. On the other hand, the microphone 162 converts collected sound signals into electrical signals, which are received and converted by the audio circuit 160 into audio data. The audio data is output to the processor 180 for processing, and is sent to another intelligent terminal through the RF circuit 110. Alternatively, the audio data is output to the memory 120 for further processing. The audio circuit 160 may also include a headset jack for communicationally interfacing a peripheral headset and the intelligent terminal 1200.

The intelligent terminal 1200 facilitates a user to send and receive e-mail, browse the web, and access streaming media via the transmission module 170, such as a Wi-Fi module, which provides the user with wireless broadband Internet access. Although FIG. 6 shows the transmission module 170, note that the transmission module 170 is not an essential component of the intelligent terminal 1200, and can be optionally omitted without changing the nature and scope of the invention.

The processor 180 being a control center of the intelligent terminal 1200, uses various interfaces and connections to connect all parts of the entire phone, and performs various functions and data processing of the intelligent terminal 1200, so as to monitor the phone as a whole by running or executing the software programs and/or modules stored in the memory 120, as well as calling data stored in the memory 120. The processor 180 may optionally include one or more processing cores. In some embodiments, the processor 180 can integrate an application processor and a modulation demodulation processor, wherein the application processor mainly handles an operating system, user interfaces and applications, and the modulation demodulation processor mainly handles wireless communications. Note that the modulation demodulation processor can also be not integrated into the processor 180.

The intelligent terminal 1200 also includes the power supply 190, such as batteries, to various components. In some embodiments, the power supply can be logically connected to the processor 180 through a power management system, thus to realize charging, discharging, and power management through the power management system. The power supply 190 may further include one or more direct current (DC) or alternating current (AC) power supplies, recharging systems, power fault detection circuits, power converters or inverters, power status indicators, and other components.

Although not shown, the intelligent terminal 1200 can further include a camera, such as a front camera, and a rear camera, a Bluetooth module, which are not detailed in the description. Specifically, in the embodiment, the display unit of the intelligent terminal is a touch screen display. The intelligent terminal further includes memory, as well as one or more programs, one or more of which are stored in memory. The one or more programs configured to be executed by one or more processors contain instructions for performing the following steps of:

the intelligent terminal receives the time domain signals that includes time domain reference signals superimposed with the time domain data;

performing FFT on the received time domain signals to generate frequency domain signals comprising the frequency domain reference signals superimposed with the frequency domain data;

obtaining the frequency domain data being inserted with the frequency domain reference signals by equivalently transforming the frequency domain signals; and obtaining the frequency domain data by separating the frequency domain reference signals and the frequency domain data.

In particular, after the step of the intelligent terminal receiving the time domain signals comprising the time domain reference signals superimposed with the time domain data, and before the step of performing FFT on the received time domain signals to generate frequency domain signals comprising frequency domain reference signals superimposed with frequency domain data, the intelligent terminal further executes the step of:

the intelligent terminal matching the time domain reference signals with preset reference signals to determine a synchronous timing function; and determining locations of the frequency domain reference signals according to the synchronous timing function.

In particular, the step of the intelligent terminal matching the time domain reference signals with the preset reference signals to determine the synchronous timing function further comprises:

the intelligent terminal matching the time domain signals with the preset reference signals using the maximum likelihood algorithm to determine the synchronous timing function.

In particular, the preset reference signals comprise a Zadoff-Chu sequence.

In particular, the reference signals comprise a time domain signal sequence transformed from the frequency domain reference signals equally spaced and inserted by a communication base station into the frequency domain data.

In particular, the step of performing FFT on the received time domain signals to generate the frequency domain signals comprising the frequency domain reference signals superimposed with the frequency domain data, further comprises:

the intelligent terminal distinguishing time domain synchronization points using the synchronous timing function, and performing FFT on the received time domain signals according to the time domain synchronization points to generate the frequency domain signals comprising the frequency domain reference signals superimposed with the frequency domain data.

In particular, the step of obtaining the frequency domain data being inserted with the frequency domain reference signals by equivalently transforming the frequency domain signals further comprises:

the FFT processed frequency domain signals containing a subcarrier used for transmission of data signals, and the intelligent terminal obtaining the frequency domain data being inserted with the frequency domain reference signals by demodulating the data signal transmitted by the subcarrier.

Different from current technology, the intelligent terminal of the embodiment receives the time domain signals that includes time domain reference signals superimposed with the time domain data. Additionally, the intelligent terminal has a preset reference signal. The reference signals comprise the time domain signal sequence transformed from the frequency domain reference signals equally spaced and inserted by a communication base station into the frequency domain data. The synchronous timing function is determined based on autocorrelation characteristics of the reference signals and the received time domain signals. A corresponding data processing method which can improve synchronization processing and user experience is determined according to the synchronous timing function.

The above description is merely some embodiments of the invention, which does not limit the scope of the invention. Any equivalent structure or process modification based on the specification and drawing of the invention, or any application of disclosure either directly or indirectly applied in other relevant technical fields, are included in the scope of claims of the invention.

What is claimed is:

1. A data processing method based on an orthogonal frequency division multiplexing (OFDM) system, wherein the data processing method comprises:
   an intelligent terminal receiving time domain signals comprising time domain reference signals superimposed with time domain data;
   performing Fast Fourier Transform (FFT) on the received time domain signals to generate frequency domain signals comprising frequency domain reference signals superimposed with frequency domain data;
   obtaining the frequency domain data being inserted with the frequency domain reference signals by equivalently transforming the frequency domain signals; and
   obtaining the frequency domain data by separating the frequency domain reference signals and the frequency domain data.

2. The data processing method of claim 1, wherein after the step of the intelligent terminal receiving the time domain signals comprising the time domain reference signals superimposed with the time domain data, and before the step of performing FFT on the received time domain signals to generate the frequency domain signals comprising the frequency domain reference signals superimposed with the frequency domain data, the method further comprises:
   the intelligent terminal matching the time domain reference signals with preset reference signals to determine a synchronous timing function; and
   determining locations of the frequency domain reference signals according to the synchronous timing function.

3. The data processing method of claim 2, wherein the step of the intelligent terminal matching the time domain reference signals with the preset reference signals to determine the synchronous timing function further comprises:
   the intelligent terminal matching the time domain signals with the preset reference signals using a maximum likelihood algorithm to determine the synchronous timing function.

4. The data processing method of claim 2, wherein the preset reference signals comprise a Zadoff-Chu sequence.

5. The data processing method of claim 2, wherein the reference signals comprise a time domain signal sequence transformed from the frequency domain reference signals equally spaced and inserted by a communication base station into the frequency domain data.

6. The data processing method of claim 2, wherein the step of performing FFT on the received time domain signals to generate the frequency domain signals comprising the frequency domain reference signals superimposed with the frequency domain data, further comprises:
   the intelligent terminal distinguishing time domain synchronization points using the synchronous timing function, and performing FFT on the received time domain signals according to the time domain synchronization points to generate the frequency domain signals comprising the frequency domain reference signals superimposed with the frequency domain data.

7. The data processing method of claim 1, wherein the step of obtaining the frequency domain data being inserted with the frequency domain reference signals by equivalently transforming the frequency domain signals further comprises:
   the FFT processed frequency domain signals containing a subcarrier used for transmission of data signals, and the intelligent terminal obtaining the frequency domain data being inserted with the frequency domain reference signals by demodulating the data signal transmitted by the subcarrier.

8. An intelligent terminal comprising a communication circuit, memory, and a processor, wherein the processor is coupled to and connected with the communication circuit and the memory, the communication circuit is configured to communicate with a base station, receive and transmit data, the memory is used to store a computer program performed by the processor and intermediate data generated during execution of the computer program, the processor when executing the computer program, performs the following steps:
   the intelligent terminal receiving time domain signals comprising time domain reference signals superimposed with time domain data;
   performing Fast Fourier Transform (FFT) on the received time domain signals to generate frequency domain signals comprising frequency domain reference signals superimposed with frequency domain data;
   obtaining the frequency domain data being inserted with the frequency domain reference signals by equivalently transforming the frequency domain signals; and
   obtaining the frequency domain data by separating the frequency domain reference signals and the frequency domain data.

9. The intelligent terminal of claim 8, wherein after the step of the intelligent terminal receiving the time domain signals comprising the time domain reference signals superimposed with the time domain data, and before the step of performing FFT on the received time domain signals to generate frequency domain signals comprising frequency domain reference signals superimposed with frequency domain data, the intelligent terminal further executes the step of:

the intelligent terminal matching the time domain reference signals with preset reference signals to determine a synchronous timing function; and determining locations of the frequency domain reference signals according to the synchronous timing function.

10. The intelligent terminal of claim 9, wherein the step of the intelligent terminal matching the time domain reference signals with the preset reference signals to determine the synchronous timing function further comprises:

the intelligent terminal matching the time domain signals with the preset reference signals using a maximum likelihood algorithm to determine the synchronous timing function.

11. The intelligent terminal of claim 9, wherein the preset reference signals comprise a Zadoff-Chu sequence.

12. The intelligent terminal of claim 9, wherein the reference signals comprise a time domain signal sequence transformed from the frequency domain reference signals equally spaced and inserted by a communication base station into the frequency domain data.

13. The intelligent terminal of claim 9, wherein the step of performing FFT on the received time domain signals to generate the frequency domain signals comprising the frequency domain reference signals superimposed with the frequency domain data, further comprises:

the intelligent terminal distinguishing time domain synchronization points using the synchronous timing function, and performing FFT on the received time domain signals according to the time domain synchronization points to generate the frequency domain signals comprising the frequency domain reference signals superimposed with the frequency domain data.

14. The intelligent terminal of claim 8, wherein the step of obtaining the frequency domain data being inserted with the frequency domain reference signals by equivalently transforming the frequency domain signals further comprises:

the FFT processed frequency domain signals containing a subcarrier used for transmission of data signals, and the intelligent terminal obtaining the frequency domain data being inserted with the frequency domain reference signals by demodulating the data signal transmitted by the subcarrier.

* * * * *